(12) United States Patent
Lee

(10) Patent No.: US 11,809,365 B2
(45) Date of Patent: Nov. 7, 2023

(54) DATA TRANSMISSION METHOD

(71) Applicant: GENESYS LOGIC, INC., New Taipei (TW)

(72) Inventor: Wei-Te Lee, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 0 days.

(21) Appl. No.: 17/676,859

(22) Filed: Feb. 22, 2022

(65) Prior Publication Data

US 2022/0283980 A1 Sep. 8, 2022

(30) Foreign Application Priority Data

Mar. 8, 2021 (TW) .................................. 110108068

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ...................................................... G16H 40/67
See application file for complete search history.

(56) References Cited

U.S. PATENT DOCUMENTS

| 7,627,708 | B2* | 12/2009 | Bohm | .................. | G06F 13/385 |
| | | | | | 710/110 |
| 2011/0022743 | A1* | 1/2011 | Liu | ........................ | G06F 13/36 |
| | | | | | 710/36 |
| 2019/0332558 | A1 | 10/2019 | Goel | | |

FOREIGN PATENT DOCUMENTS

CN        112199314        1/2021

* cited by examiner

*Primary Examiner* — Henry Tsai
*Assistant Examiner* — Juanito C Borromeo
(74) *Attorney, Agent, or Firm* — JCIPRNET

(57) ABSTRACT

A data transmission method, applicable between a first USB host and a second USB host, is provided. The first USB host includes a host software, and the second USB host includes a controlled software. The data transmission method includes the following steps. A connection is established from a USB hub to the first USB host via its first USB port. A connection is established from a USB hub to the second USB host via its second USB port. A first USB transmission channel between the first USB host and the second USB host is provided by the USB hub. A first data is transmitted to the USB hub via the first USB port and the first data is transmitted to the second USB host through the first USB transmission channel of the USB hub via the second USB port by the host software and the controlled software.

6 Claims, 4 Drawing Sheets

DATA TRANSMISSION METHOD

CROSS-REFERENCE TO RELEVANT APPLICATION

This application claims the priority benefit of Taiwan application serial no. 110108068, filed on Mar. 8, 2021. The entirety of the above-mentioned patent application is hereby incorporated by reference herein and made a part of this specification.

BACKGROUND

Technical Field

This disclosure relates to a data transmission method, and in particular to a data transmission method applicable between Universal Serial Bus (USB) hosts.

Description of Related Art

Universal Serial Bus (USB) is a serial port bus standard that connects a host and an external device, and it is also a technical specification for input and output interfaces. USB is widely used in personal computers, mobile devices, photographic equipment, digital TVs (set-top boxes), game consoles and other products. A USB hub (Hub) allows the host to connect to more external devices.

Usually, the USB hub has only one upstream port (USB connector) to connect to the USB host (USB host). The other connectors of the USB hub are downstream ports, which are used to connect to USB devices. In general, the USB hub cannot be connected to multiple USB hosts concurrently. How to enable data transmission among the multiple USB hosts remains one of the challenges in this field.

SUMMARY

This disclosure provides a data transmission method, so as to enable data transmission between different USB hosts through a USB interface.

A data transmission method of the disclosure is applicable between a first USB host and a second USB host. The first USB host includes a host software, and the second USB host includes a controlled software. The data transmission method includes the following steps. A connection is established from a USB hub to the first USB host via its first USB port. A connection is established from a USB hub to the second USB host via its second USB port. A first USB transmission channel between the first USB host and the second USB host is provided by the USB hub. A first data is transmitted to the USB hub via the first USB port and the first data is transmitted to the second USB host through the first USB transmission channel of the USB hub via the second USB port by the host software and the controlled software.

Based on the above, the data transmission system and data transmission method according to the embodiments of the disclosure may be implemented by the USB transmission channels between the different USB hosts provided by the USB hub. The USB host can use the USB transmission channels of the USB hub to transmit the data (such as the human-machine interface device operation information) to the other USB hosts.

To make the abovementioned more comprehensible, several embodiments accompanied by drawings are described in detail as follows.

DESCRIPTION OF THE EMBODIMENTS

Figure 1:
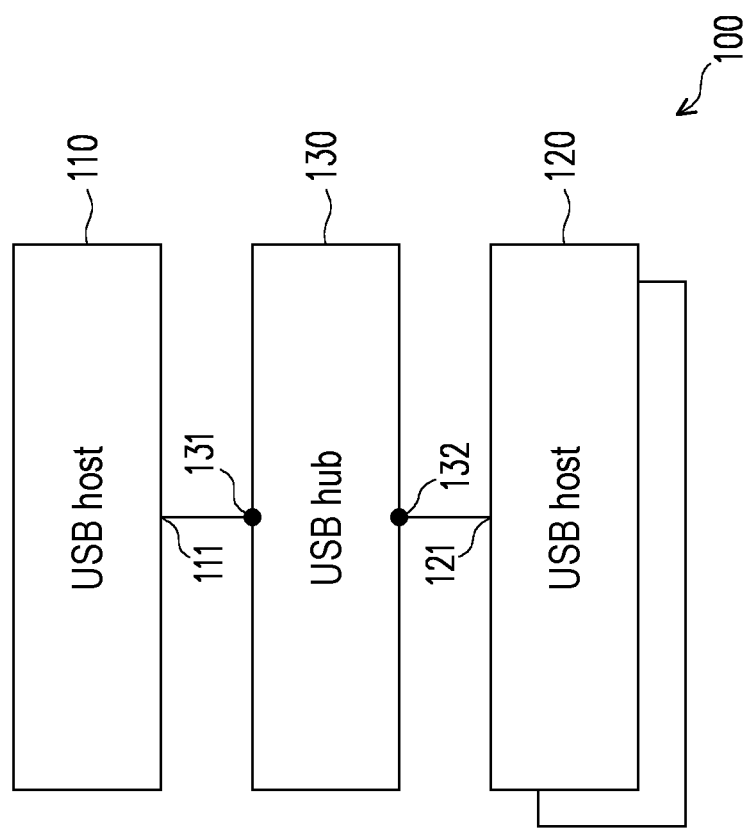
FIG. 1 is a schematic circuit block diagram of a data transmission system according to an embodiment of the disclosure.

The term "coupled to (or connected to)" used in the full text of the specification of this disclosure (including the scope of the patent application) may refer to any direct or indirect connection means. For example, if the text describes that the first device is coupled (or connected) to the second device, it should be interpreted as that the first device may be directly connected to the second device, or the first device may be indirectly connected to the second device through other devices or some forms of connection means. Terms such as "first" and "second" mentioned in the full text of the specification of this disclosure (including the scope of the patent application) are used for naming an element, or to distinguish between the different embodiments or ranges, and are not used to limit an upper limit or an lower limit of the number of the element, and are not used to limit a sequence of the element. In addition, wherever possible, elements/components/steps with the same reference numerals in the drawings and the embodiments represent the same or similar parts. Reference may be made to the relevant descriptions of the elements/components/steps using the same reference numerals or using the same terminology in the different embodiments.

FIG. 1 is a schematic circuit block diagram of a data transmission system 100 according to an embodiment of the disclosure. The data transmission system 100 includes multiple USB hosts (such as USB hosts 110 and 120 shown in FIG. 1) and a USB hub 130. The USB host 110 and the USB host 120 are USB hosts that conform to USB protocol. For example, in some embodiments, the USB host 110 (or the USB host 120) may be a personal computer, a server, a tablet computer, or other USB hosts. In some embodiments, the USB host 110 may include a host software, and the USB host 120 may include a controlled software. In other embodiments, the USB host 110 may include the controlled software, and the USB host 120 may include the host software.

The USB host 110 and the USB host 120 may be various forms of computing platforms. In an embodiment, the USB host 110 may run on a first operating system, and the USB host 120 may run on a second operating system (different from the first operating system). That is, the USB host 110 and the USB host 120 may run on different operating systems. For example, the USB host 110 may run on a Windows operating system, and the USB host 120 may run on a Linux operating system. In other embodiments, the first operating system may also be the same as the second operating system according to an actual application scenario.

The USB hub 130 has a USB port 131 and a USB port 132. The USB port 131 and/or the USB port 132 may be a USB type-C connector that conforms to the USB protocol, or other USB connectors. For example, the USB port 131 and the USB port 132 may be USB upstream ports. The USB port 131 is coupled to a USB downstream port 111 of the USB host 110. The USB upstream port 132 is coupled to a USB downstream port 121 of the USB host 120.

Figure 2:
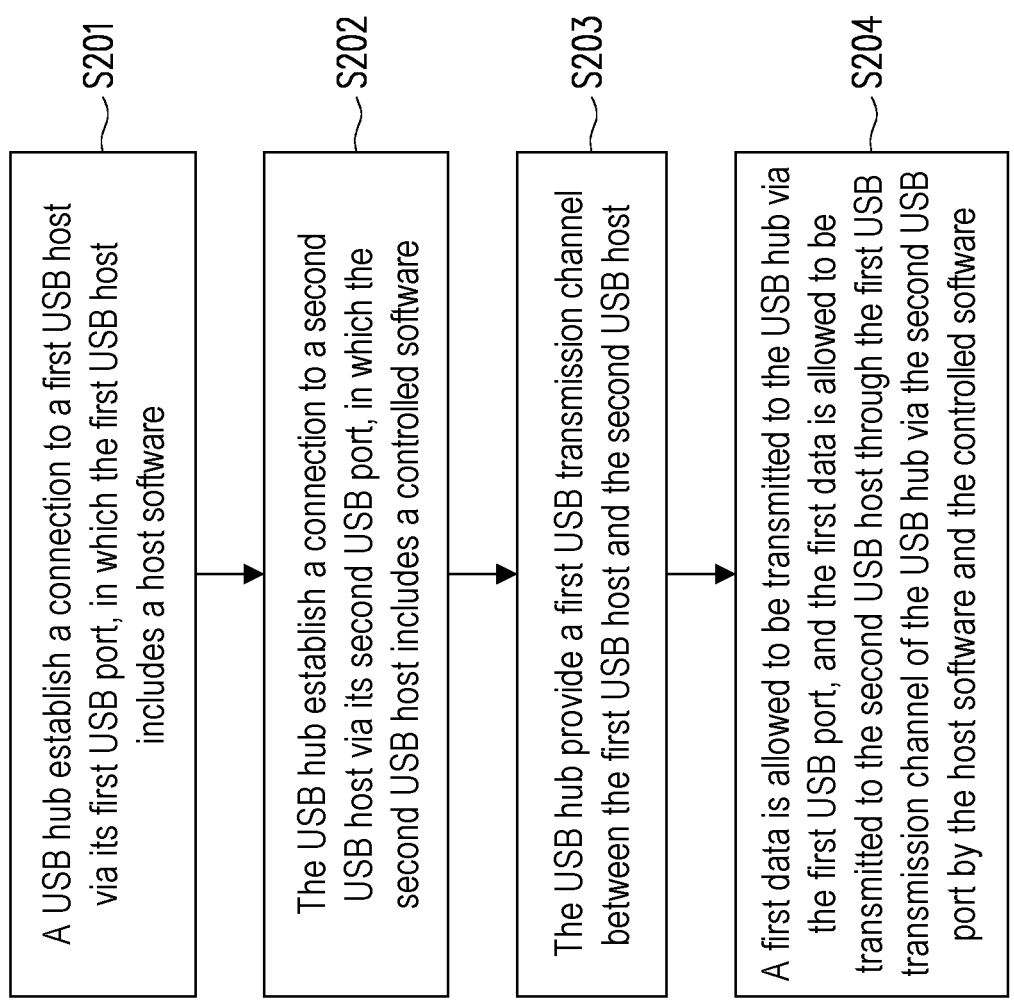
FIG. 2 is a schematic flowchart of a data transmission method according to an embodiment of the disclosure.

FIG. 2 is a schematic flowchart of a data transmission method according to an embodiment of the disclosure. With reference to FIGS. 1 and 2, in Step S201, the USB hub 130 may establish a connection to the USB host 110 via its USB port 131. For example, the USB hub 130 may establish a connection to the USB host 110 via the USB port 131 in a manner specified by the USB protocol.

In Step S202, the USB hub 130 may establish a connection to the USB host 120 via its USB port 132. For example, the USB hub 130 may establish a connection to the USB host 120 via the USB port 132 in a manner specified by the USB protocol.

In Step S203, the USB hub 130 may provide a USB transmission channel between the USB host 110 and the USB host 120. The USB host 110 and the USB host 120 may transmit data to each other through the USB transmission channel of the USB hub 130.

In Step S204, a first data may be transmitted to the USB hub 130 via the USB port 131 of the USB hub 130, and the first data may be transmitted to the USB host 120 through the USB transmission channel provided by the USB hub 130 via the USB port 132, by the host software of the USB host 110 and the controlled software of the USB host 120. In some embodiments, the host software and the controlled software adopt an end-to-end manner to allow the first data to be transmitted to the USB hub 130 via the USB port 131 and to allow the first data to be transmitted to the USB host 120 through the USB transmission channel of the USB hub 130 via the USB port 132.

In an embodiment, the USB port 131 and/or the USB port 132 of the USB hub 130 may support an inter-domain connection function specified by USB4 protocol. For example, the USB hub 130 may provide the USB transmission channel between the USB host 110 and the USB host 120 using the inter-domain connection when a communication protocol transmitted on the USB port 131 and a communication protocol transmitted on the USB port 132 are both the USB4 communication protocol.

In other exemplary embodiments, a host bridge unit (not shown in FIG. 1, which will be described later in FIG. 3) is disposed in the USB hub when the communication protocol transmitted on one of the two USB ports of the USB hub is not the USB4 communication protocol. The host bridge unit may provide a bridge interface so that the USB host 110 and the USB host 120 may exchange data with each other. Furthermore, the USB hub of the embodiment may still provide the USB transmission channel between the USB host 110 and the USB host 120. In the embodiment, the USB transmission channel includes a transmission path of the host bridge unit.

In some application scenarios, the USB host 110 may have a human-machine interface device (not shown), such as a human interface device (HID). The human-machine interface device may include a keyboard, a mouse, and/or other human-machine interface devices. The human-machine interface device of the USB host 110 may be shared with the USB host 120. That is, a user may control/operate the USB host 120 by operating the human-machine interface device of the USB host 110.

In an embodiment, the host software (an application or a driver) running on the USB host 110 may to transmit human-machine interface device operation information 110 (or HID operation information, such as a movement vector of a mouse or which key of the keyboard is being pressed) of the human-machine interface device of the USB host to the USB host 120 through the USB transmission channel of the USB hub 130. The USB host 120 may use software simulation to convert the operation information of the human-machine interface device of the USB host 110 into a human-machine interface device report (such as an HID report, an interrupt event) that conforms to the USB protocol. For example, the controlled software (an application or a driver) running on the USB host 120 may convert (simulate) the operation information of the human-machine interface device of the USB host 110 into an HID report that conforms to the USB protocol. Therefore, the user may control/operate the USB host 120 by operating the human-machine interface device of the USB host 110. The HID report of the human-machine interface device may be HID interrupt data that conforms to USB specification. The HID report of the human-machine interface device may be defined in HID descriptor presented by the HID device to the USB host 110.

In another embodiment, the USB host 110 may transmit the HID operation information of the human-machine interface device (not shown) of the USB host 110 to the USB host 120 through the USB transmission channel of the USB hub 130, and then the USB host 120 may output the HID operation information of the USB host 110 to the USB hub 130. The USB hub 130 re-transmits the HID operation information to the USB host 120 in a form of an HID report (an interrupt event). That is, the USB hub 130 may generate an HID report that conforms to a manner specified by the USB protocol to the USB host 120 according to the HID operation information provided by the USB host 120. Therefore, the USB host 120 may regard the USB hub 130 as a physical human-machine interface device.

Figure 3:
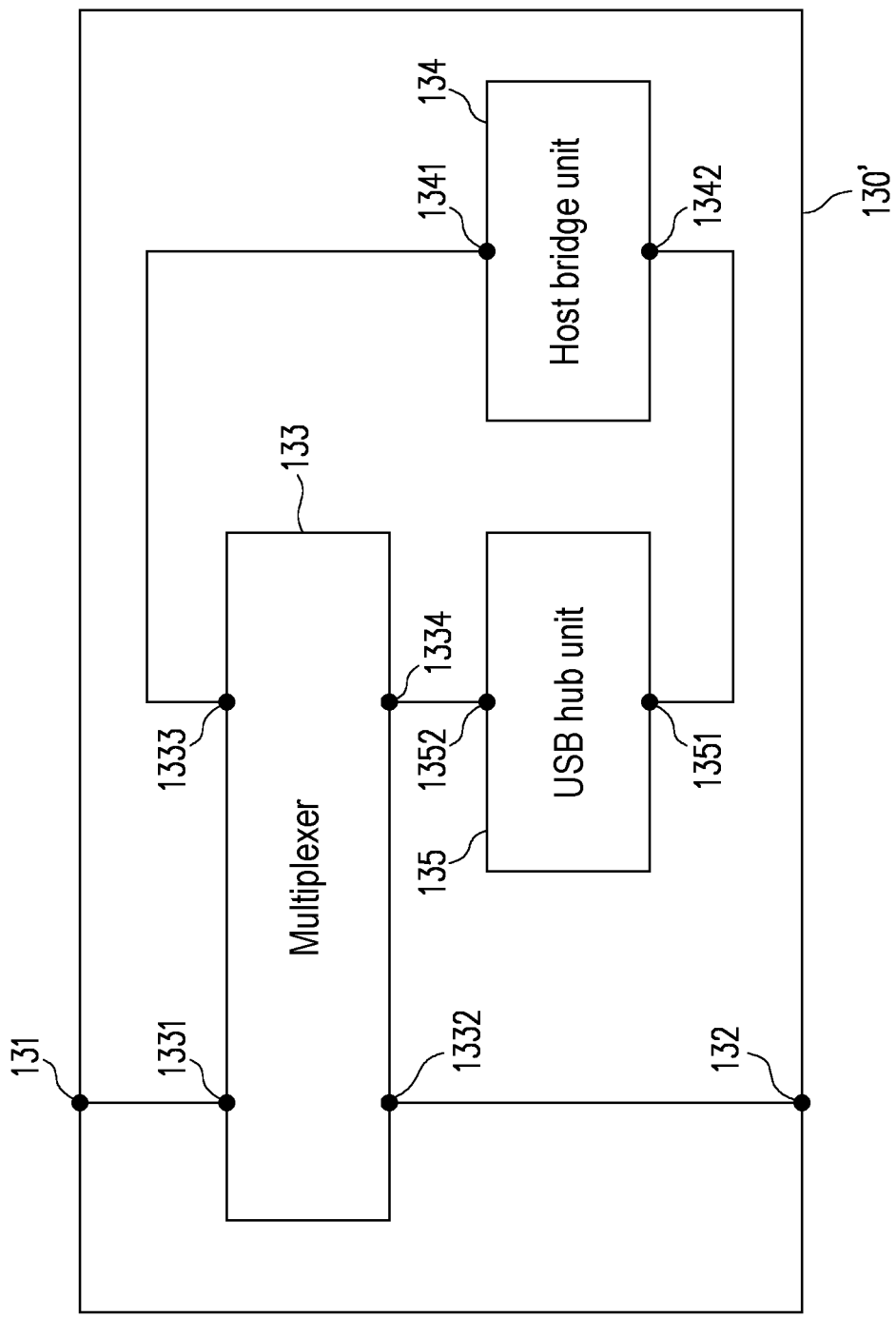
FIG. 3 is a schematic circuit block diagram illustrating the USB hub according to an embodiment of the disclosure.

FIG. 3 is a schematic circuit block diagram illustrating the USB hub according to an embodiment of the disclosure. In some embodiments, reference may be made to relevant description of the USB hub 130' shown in FIG. 3 for the USB hub 130 shown in FIG. 1, according to actual design. The USB hub 130' shown in FIG. 3 includes a multiplexer 133, a host bridge unit 134, and a USB hub unit 135. The multiplexer 133 has a connection end 1331, a connection end 1332, a connection end 1333, and a connection end 1334. The connection end 1331 is coupled to the USB port 131, and the connection end 1332 is coupled to the USB port 132.

The host bridge unit 134 has a connection end 1341 and a connection end 1342. The connection end 1333 of the multiplexer 133 is coupled to the connection end 1341 of the host bridge unit 134. The host bridge unit 134 may provide a bridging interface between the connection end 1341 and the connection end 1342, enabling the USB host 110 and the USB host 120 to exchange data with each other in a scenario where one of the communication protocols transmitted on the USB port 131 and the USB port 132 of the USB hub 130' is not the USB4 communication protocol, or the communication protocols transmitted on the USB port 131 and the USB port 132 of the USB hub 130' are both not the USB4 communication protocol. That is, the USB hub 130' may provide the USB transmission channel between the USB host 110 and the USB host 120 when the USB host 110 is connected to the USB port 131 and the USB host 120 is connected to the USB port 132.

The USB hub unit 135 has a connection end 1351 and a connection end 1352. The connection end 1334 of the multiplexer 133 is coupled to the connection end 1352 of the USB hub unit 135. The connection end 1342 of the host bridge unit 134 is coupled to the connection end 1351 of the USB hub unit 135.

For example, the multiplexer 133 may receive data from the USB port 131 through the connection end 1331 in a scenario where at least one of the communication protocols transmitted on the USB port 131 and the USB port 132 of the USB hub 130' is not the USB4 communication protocol. Then, the multiplexer 133 may transmit the data to the connection end 1352 of the USB hub unit 135 through the connection end 1334. The USB3 hub unit 135 may transmit the data to the connection end 1342 of the host bridge unit 134 through the connection end 1351. The host bridge unit 134 may transmit the data to the connection end 1333 of the multiplexer 133 through the connection end 1341, and then the multiplexer 133 may transmit the data to the USB port 132 through the connection end 1332.

Figure 4:
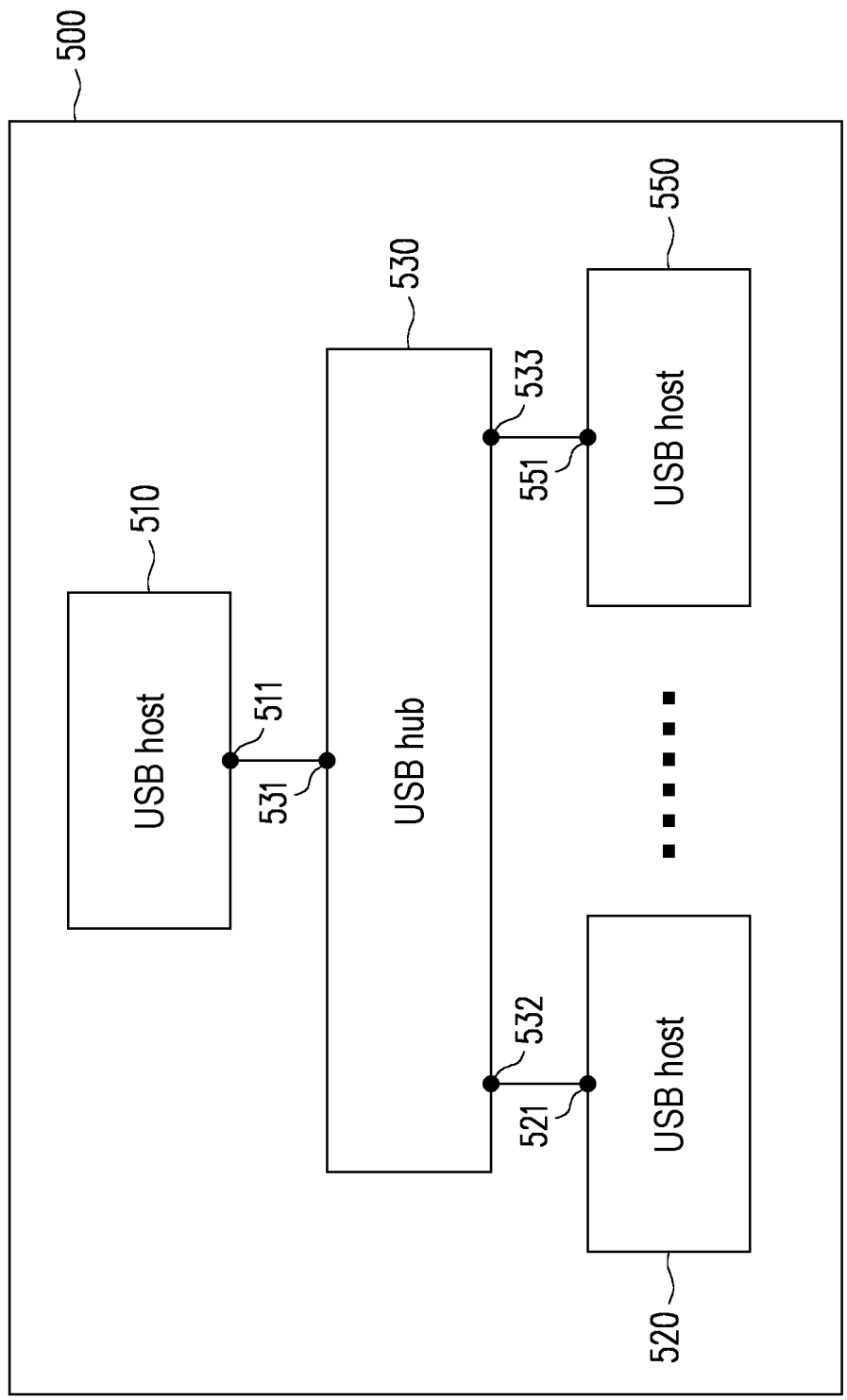
FIG. 4 is a schematic circuit block diagram of a data transmission system according to another embodiment of the disclosure.

FIG. 4 is a schematic circuit block diagram of a data transmission system 500 according to another embodiment of the disclosure. The data transmission system 500 shown in FIG. 4 includes a USB host 510, a USB host 520, a USB host 550, and a USB hub 530. The USB host 510, the USB host 520, and the USB hub 530 shown in FIG. 4 may be deduced by analogy with reference to relevant descriptions of the USB host 110, the USB host 120, and the USB hub 130' shown in FIG. 3, which will not be repeated.

The USB host 550 shown in FIG. 4 is a USB host that conforms to the USB protocol. For example, in some embodiments, the USB host 550 may be a personal computer, a server, a tablet computer, or other USB hosts. The USB host 550 may be a computing platform in various forms. In an embodiment, the USB host 550 may run on a third operating system, and the third operating system may be different from the operating systems of the USB host 510 and/or the USB host 520. In other embodiments, the operating system of the USB host 550 may be the same as the operating system of the USB host 510 and/or the USB host 520 according to the actual application scenario.

The USB hub 530 shown in FIG. 4 has a USB port 531, a USB port 532, and a USB port 533. The USB ports 531, 532, and/or 533 may be USB type-C connectors that conforms to the USB protocol, or other USB connectors. The USB port 531 of the USB hub 530 is coupled to a USB downstream port 511 of the USB host 510. The USB port 532 of the USB hub 530 is coupled to a USB downstream port 521 of the USB host 520. A USB downstream port 551 of the USB host 550 is coupled to the USB port 533 of the USB hub 530.

In an embodiment, the USB hub 530 may provide a USB transmission channel between the USB host 510 and the USB host 520, and the USB hub 530 may provide another USB transmission channel between the USB host 510 and the USB host 550. The USB host 510 and the USB host 550 may transmit data to each other through the USB transmission channel of the USB hub 530. For example, the host software (an application or a driver) running on the USB host 510 may transmit a first data to the USB hub 530. The USB hub 530 may receive the first data from the USB downstream port 511 of the USB host 510 through the USB port 531, and then the USB hub 530 may transmit the first data of the USB host 510 to the USB downstream port 521 of the USB host 520 through the USB port 532. Therefore, the controlled software (an application or a driver) running on the USB host 520 may obtain the first data of the USB host 510.

The host software (an application or a driver) running on the USB host 520 may transmit a second data to the USB hub 530. The USB hub 530 may receive the second data from the USB downstream port 521 of the USB host 520 through the USB port 532, and then the USB hub 530 may transmit the second data of the USB host 520 to the USB downstream port 511 of the USB host 510 through the USB port 531. Therefore, the controlled software (an application or a driver) running on the USB host 510 may obtain the second data of the USB host 520.

The host software (an application or a driver) running on the USB host 550 may transmit a third data to the USB hub 530. The USB hub 530 may receive the third data from the USB downstream port 551 of the USB host 550 through the USB port 533, and then the USB hub 530 may transmit the third data of the USB host 550 to the USB downstream port 511 of the USB host 510 through the USB port 531. Therefore, the controlled software running on the USB host 510 may obtain the third data of the USB host 550.

The host software running on the USB host 510 may transmit a fourth data to the USB hub 530. The USB hub 530 may receive the fourth data from the USB downstream port 511 of the USB host 510 through the USB port 531, and then the USB hub 530 may transmit the fourth data of the USB host 510 to the USB downstream port 551 of the USB host 550 through the USB port 533. Therefore, the controlled software (an application or a driver) running on the USB host 550 may obtain the fourth data of the USB host 510.

The USB host 520 and the USB host 550 may transmit data to each other according to an actual application. For example, the USB host 520 may transmit the fourth data to the USB host 510 through the USB transmission channel provided by the USB hub 530, and then the USB host 510 may transmit the fourth data of the USB host 520 to the USB host 550 through the USB transmission channel provided by the USB hub 530, and vice versa.

In another embodiment, the USB hub 530 may also provide a USB transmission channel between the USB host 520 and the USB host 550 to enable the USB host 520 and the USB host 550 to transmit data to each other. For example, the USB hub 530 may receive a fifth data from the USB host 520 through the USB port 532, and then the USB hub 530 may transmit the fifth data of the USB host 520 to the USB host 550 through the USB port 533, and vice versa.

In summary, the USB hub according to the foregoing embodiments may provide the USB transmission channels. The different USB hosts may transmit data to each other through the USB transmission channels provided by the USB hub. For example, the first USB host may use the USB transmission channel provided by the USB hub to transmit the human-machine interface device operation information (such as the HID operation information) to the second USB host. Therefore, the HID device of the first USB host may be shared with the second USB host.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:
1. A data transmission method, applicable between a first USB host and a second USB host, wherein the first USB host comprises a host software, the second host comprises a controlled software, the data transmission method comprising:

establishing a connection to the first USB host by a USB hub via a first USB port of the USB hub, wherein the first USB port is coupled to a first USB downstream port of the first USB host;

establishing a connection to the second USB host by the USB hub via a second USB port of the USB hub, wherein the second USB port is coupled to a second USB downstream port of the second USB host;

establishing a connection to a third USB host by the USB hub via a third USB port of the USB hub, wherein the third USB port is coupled to a third USB downstream port of the third USB host, and at least one of the first USB port, the second USB port and the third USB port of the USB hub support an inter-domain connection function specified by USB4 protocol;

providing a first USB transmission channel between the first USB host and the second USB host by the USB hub;

providing a second USB transmission channel between the first USB host and the third USB host by the USB hub;

providing a third USB transmission channel between the second USB host and the third USB host by the USB hub;

receiving a first data from the first USB downstream port of the first USB host by the USB hub through the first USB port;

allowing the first data to be transmitted to the USB hub via the first USB port and allowing the first data to be transmitted to the second USB host through the first USB transmission channel of the USB hub via the second USB port by the host software and the controlled software;

transmitting the first data to the second USB downstream port of the second USB host by the USB hub through the second USB port;

receiving a second data from the second USB downstream port of the second USB host by the USB hub through the second USB port;

transmitting the second data to the first USB downstream port of the first USB host by the USB hub through the first USB port;

receiving a third data from the third USB downstream port of the third USB host by the USB hub through the third USB port; and transmitting the third data to the first USB downstream port of the first USB host by the USB hub through the first USB port.

2. The data transmission method according to claim 1, wherein the first USB transmission channel is provided between the first USB host and the second USB host by the USB hub, and the USB hub may use an inter-domain connection to provide the first USB transmission channel between the first USB host and the second USB host when a communication protocol transmitted on the first USB port of the USB hub and a communication protocol transmitted on the second USB port of the USB hub are both USB4 communication protocol.

3. The data transmission method according to claim 1, wherein the first USB host runs on a first operating system, the second USB host runs on a second operating system, wherein the first operating system is different from the second operating system.

4. The data transmission method according to claim 1, further comprising:

transmitting a human-machine interface device operation information to the second USB host by the first USB host through the first USB transmission channel of the USB hub; and converting the human-machine interface device operation information into a human-machine interface device report that conforms to a USB protocol by the second USB host.

5. The data transmission method according to claim 1, further comprising:

transmitting a human-machine interface device operation information of a human-machine interface device of the first USB host to the second USB host by the first USB host through the first USB transmission channel of the USB hub;

outputting the human-machine interface device operation information to the USB hub by the second USB host; and re-transmitting the human-machine interface device operation information to the second USB host in a form of a human-machine interface device report by the USB hub.

6. The data transmission method according to claim 1, wherein the host software and the controlled software adopt an end-to-end manner to allow the first data to be transmitted to the USB hub via the first USB port, and to allow the first data to be transmitted to the second USB host through the first USB transmission channel of the USB hub via the second USB port.

* * * * *